(12) United States Patent
Kilian et al.

(10) Patent No.: US 11,368,186 B2
(45) Date of Patent: Jun. 21, 2022

(54) TRANSMITTER AND RECEIVER AND CORRESPONDING METHODS

(71) Applicant: Fraunhofer-Gesellschaft zur Foerderung der angewandten Forschung e.V., Munich (DE)

(72) Inventors: Gerd Kilian, Erlangen (DE); Josef Bernhard, Nabburg (DE); Wolfram Strauss, Nuremberg (DE); Jakob Kneissl, Fuerth (DE); Johannes Wechsler, Spalt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/598,653

(22) Filed: Oct. 10, 2019

(65) Prior Publication Data

US 2020/0052736 A1 Feb. 13, 2020

Related U.S. Application Data

(63) Continuation of application No. PCT/EP2018/025107, filed on Apr. 10, 2018.

(30) Foreign Application Priority Data

Apr. 11, 2017 (DE) ...................... 10 2017 206 258.4

(51) Int. Cl.
*H04B 1/7143* (2011.01)
*H04L 1/08* (2006.01)
*H04L 5/00* (2006.01)

(52) U.S. Cl.
CPC ............ *H04B 1/7143* (2013.01); *H04L 1/08* (2013.01); *H04L 5/0012* (2013.01); *H04L 5/0044* (2013.01)

(58) Field of Classification Search
CPC . H04L 1/0045; H04L 1/00; H04L 1/20; H04L 5/00; H04L 1/08; H04L 5/0012; H04L 5/0044; H04B 1/7143
See application file for complete search history.

(56) References Cited

U.S. PATENT DOCUMENTS

| 4,774,716 A | 9/1988 | Hagmann |
| 5,907,545 A * | 5/1999 | Arai ..................... H04B 7/2621 370/342 |

(Continued)

FOREIGN PATENT DOCUMENTS

| CN | 1081413 A | 2/1994 |
| CN | 1312980 A | 9/2001 |

(Continued)

OTHER PUBLICATIONS

Kilian, G. et al., "Improved coverage for low-power telemetry systems using telegram splitting", Proceedings of 2013 European Conference on Smart Objects, Systems and Technologies (SmartSysTech), Jun. 2013.

(Continued)

*Primary Examiner* — Sophia Vlahos
(74) *Attorney, Agent, or Firm* — Perkins Coie LLP; Michael A. Glenn

(57) ABSTRACT

The invention refers to a transmitter that emits data in the form of a group of at least two partial telegrams that together include the data and that are shorter than an individual telegram comprising the data. The transmitter emits the group of partial telegrams according to a hopping pattern that refers to times and/or transmission frequencies of the emission of the individual partial telegrams. Furthermore, the transmitter emits the group of partial telegrams several times and at least twice. Furthermore, the invention relates to a receiver and corresponding methods.

30 Claims, 2 Drawing Sheets

(56) References Cited

U.S. PATENT DOCUMENTS

| | | | |
|---|---|---|---|
| 5,978,366 A | 11/1999 | Massingill et al. | |
| 6,078,609 A * | 6/2000 | Nago | H04B 1/713 370/436 |
| 6,246,713 B1 * | 6/2001 | Mattisson | H04L 5/0041 375/132 |
| 8,345,726 B1 * | 1/2013 | Haendel | H04B 1/713 375/132 |
| 2005/0176371 A1 | 8/2005 | Palin et al. | |
| 2006/0013285 A1 * | 1/2006 | Kobayashi | H04L 5/023 375/132 |
| 2008/0075145 A1 * | 3/2008 | Balachandran | H04B 1/715 375/132 |
| 2012/0026959 A1 | 2/2012 | Julian et al. | |
| 2012/0230370 A1 * | 9/2012 | Shaffer | H04W 28/065 375/133 |
| 2013/0172034 A1 | 7/2013 | Kubota | |
| 2014/0176341 A1 * | 6/2014 | Bernhard | H04Q 9/00 340/870.02 |
| 2016/0044729 A1 | 2/2016 | Tu et al. | |
| 2017/0013466 A1 | 1/2017 | Xu et al. | |
| 2018/0152264 A1 | 5/2018 | Kilian et al. | |
| 2018/0176945 A1 * | 6/2018 | Cao | H04L 5/0091 |

FOREIGN PATENT DOCUMENTS

| | | |
|---|---|---|
| CN | 101517993 A | 8/2009 |
| CN | 101754268 A | 6/2010 |
| DE | 10211235 A1 | 10/2003 |
| DE | 102011082098 A1 | 3/2013 |
| EP | 0236558 A1 | 9/1987 |
| EP | 3125453 A1 | 2/2017 |
| JP | 2005286753 A | 10/2005 |
| JP | 2006333246 A | 12/2006 |
| JP | 2007116543 A | 5/2007 |
| JP | 2012501595 A | 1/2012 |
| JP | 2013153417 A | 8/2013 |
| KR | 20160129053 A | 11/2016 |
| RU | 2189113 C2 | 9/2002 |
| WO | 2006012405 A2 | 2/2006 |
| WO | 2015128385 A1 | 9/2015 |
| WO | 2015149252 A2 | 10/2015 |

OTHER PUBLICATIONS

Kilian, G. et al., "Increasing Transmission Reliability for Telemetry Systems Using Telegram Splitting", IEEE Transactions on Communications, vol. 63, No. 3, pp. 949-961, Mar. 2015, pp. 949-961.

Guangdong Oppo Mobile Telecom, "Discussions on uplink grant-free transmission", 3GPP TSG RAN WG1, Meeting #88—R1-1701962, Feb. 13, 2017, 5 pp.

Robert, Joerg, et al., "Large Area Experimental Telemetry Network for Infrastructure Monitoring Applications", Smart SysTech 2015; European Conference on Smart Objects, Systems and Technologies, 6 pp.

* cited by examiner

TRANSMITTER AND RECEIVER AND CORRESPONDING METHODS

CROSS-REFERENCES TO RELATED APPLICATIONS

This application is a continuation of copending International Application No. PCT/EP2018/025107, filed Apr. 10, 2018, which is incorporated herein by reference in its entirety, and additionally claims priority from German Application No. DE 10 2017 206 258.4, filed Apr. 11, 2017, which is incorporated herein by reference in its entirety.

BACKGROUND OF THE INVENTION

The invention refers to a transmitter and a receiver as well as to corresponding methods for transmitting and receiving data.

DE 10 2011 082 098 A1 describes the so-called "telegram splitting", wherein a data packet is divided into several partial packets (so-called telegram fragments, or in the following referred to as partial telegrams) that each only transfer a fragment of the total information to be transmitted and are each shorter than an individual telegram carrying the total information. Such a partial packet or telegram fragment is referred to as "hop". Several information symbols are transferred in a hop. The hops are transmitted on one frequency or are transmitted distributed across several frequencies (the so-called "frequency hopping"). Between the hops, there are pauses in which no transmission takes place. In a variation, the partial telegrams are transmitted using hopping patterns. In the following, the group of all associated partial telegrams may be summarized using the term telegram.

In order to be able to successfully decode a packet on the receiver side, the hopping pattern used for transmission has to be known to the receiver. To ensure this, hopping patterns that are known to all participants are defined for telegram splitting networks.

In radio transmission systems it may be an advantage to transmit the same information, or the same data, several times. This increases the reception probability when interferences occur if the systems use an uncoordinated transfer (e.g. ALOHA or Slotted ALOHA). This results from the uncoordinated transfer, since the probability to be able to transmit through a transmission channel without interference is increased through the random time of the transmission. Through the multiple transfer, it is also possible to reach a higher reception sensitivity by means of diversity. Maximal Ratio Combining (MRC) is a method for this, for example. It is a prerequisite that the receiver at least knows the relative position of the initial transmission and the repetitions before the reception so that it may combine the right symbols accordingly.

If telegram splitting is used for the transmission, the emission of the repetitions of the respective group of the partial telegrams is carried out, e.g., via a fixed time offset and/or frequency offset between the transmissions.

Thus, for example, the transmission of a first repetition starts 10 seconds after the first transmission of the total telegram, and the transmission of the second repetition starts 5 seconds after the transmission of the first repetition, etc. The temporal intervals refer to a predefined reference time (e.g. the start of the first partial telegram). This approach makes it possible for the receiver to perform the classical combination (MRC) also in telegram splitting networks.

However, there may be the case that several transmitters simultaneously emit their signals so that there is an overlap at the receiver. The signal overlap also depends on whether the transmitters use the same hopping pattern.

SUMMARY

An embodiment may have a transmitter, wherein the transmitter emits data in the form of a group of at least two partial packets that together have the data and that are shorter than an individual data packet having the data, wherein the transmitter emits the group of the partial packets according to a hopping pattern that refers to times and/or transmission frequencies of the emission of the individual partial packets, wherein the transmitter emits the group of the partial packets several times and at least twice, wherein, for an emission of the group of the partial packets following a preceding emission, the transmitter randomly offsets the hopping pattern used for the preceding emission in time and/or frequency.

Another embodiment may have a method for emitting data, wherein data is emitted in the form of a group of at least two partial packets that together have the data and that are shorter than an individual data packet having the data, wherein the group of the partial packets is emitted according to a hopping pattern that refers to times and/or transmission frequencies of the emission of the individual partial packets, and wherein the group of the partial packets is emitted several times, wherein, for an emission of the group of the partial packets following a preceding emission, the hopping pattern used for the preceding emission is randomly offset in time and/or frequency.

Another embodiment may have a receiver, wherein the receiver receives from a transmitter partial telegrams that together have data and that are shorter than an individual data packet having the data, and wherein the receiver identifies at least one hopping pattern used by the transmitter when emitting the partial packets, the hopping pattern referring to times and/or transmission frequencies of the emission of the individual partial packets, wherein the group of partial packets is emitted by the transmitter multiple times and at least twice, wherein, for an emission of the group of the partial packets following a preceding emission, the hopping pattern used for the preceding emission is randomly offset in time and/or frequency.

Another embodiment may have a method for receiving data, wherein partial packets are received that together have the data and that are shorter than an individual data packet having the data, and wherein a hopping pattern used when emitting the partial packets is identified, the hopping pattern referring to times and transmission frequencies in the emission of the individual partial packets, wherein the group of partial packets is emitted multiple times and at least twice, wherein, for an emission of the group of the partial packets following a preceding emission, the hopping pattern used for the preceding emission is randomly offset in time and/or frequency.

Another embodiment may have a system for signal transmission, wherein the system has at least one inventive transmitter and at least one inventive receiver.

Another embodiment may have a non-transitory digital storage medium having a computer program stored thereon to perform the method for emitting data, wherein data is emitted in the form of a group of at least two partial packets that together have the data and that are shorter than an individual data packet having the data, wherein the group of the partial packets is emitted according to a hopping pattern that refers to times and/or transmission frequencies of the emission of the individual partial packets, and wherein the group of the partial packets is emitted several times, wherein, for an emission of the group of the partial packets following a preceding emission, the hopping pattern used for the preceding emission is randomly offset in time and/or frequency, when said computer program is run by a computer.

Another embodiment may have a non-transitory digital storage medium having a computer program stored thereon to perform the method for receiving data, wherein partial packets are received that together have the data and that are shorter than an individual data packet having the data, and wherein a hopping pattern used when emitting the partial packets is identified, the hopping pattern referring to times and transmission frequencies in the emission of the individual partial packets, wherein the group of partial packets is emitted multiple times and at least twice, wherein, for an emission of the group of the partial packets following a preceding emission, the hopping pattern used for the preceding emission is randomly offset in time and/or frequency, when said computer program is run by a computer.

Thus, the invention is based on the object to propose a transmitter and a receiver that use telegram splitting for data communication and in which the negative influences of the emissions of signals by an interfering transmitter or by several interfering transmitters are reduced.

According to the invention, this object is solved by a transmitter.

In this case, the transmitter emits data in the form of a group of at least two partial telegrams that together comprise the data and that are shorter than an individual telegram comprising the data. In this case, the data is to be transferred by a transmitter to a receiver and is sensor data, for example. The group of the partial telegrams may also be referred to as telegram. The transmitter emits the group of the partial telegrams according to a hopping pattern that refers to times and/or transmission frequencies of the emission of the individual partial telegrams. In addition, the transmitter emits the group of the partial telegrams several times, i.e., the group of the partial telegrams is emitted at least twice. Thus, these emissions may also be referred to as initial transmission and repetition(s).

Thus, the transmitter applies the telegram splitting, wherein the partial telegrams are transmitted in dependence on a hopping pattern. In this case, the hopping patter refers to the frequencies to be used and/or the temporal intervals between the partial telegrams, or to the relative and absolute times of the transmission of the partial telegrams. In addition, the transmitter transmits the group of the partial telegrams several times, i.e., at least twice.

In a configuration, the transmitter uses different hopping patterns each for at least two emissions of the group of the partial telegrams. If the hopping patterns differ, the frequencies and/or temporal positions of the individual partial telegrams also differ between the individual emissions. In a configuration, in particular, the hopping pattern of the first emission differs from the following emissions.

In a configuration, for a selection of the hopping patterns, the transmitter accesses a stored set of reference hopping patterns. In a configuration, the set of reference hopping patterns is, in particular, also known to the receiver so that the receiver uses the appropriate hopping pattern or at least only tries the hopping patterns that are present in the set of reference hopping patterns.

In a configuration, the transmitter randomly selects a hopping pattern from the set of reference hopping patterns for an emission of the group of the partial telegrams. In this configuration, several different hopping patterns are available to the transmitter, from which it selects a respective one. The selection is random so that even in the case that two transmitters access the same set of reference hopping patterns and, possibly, use the same hopping pattern at a time, the probability that a same hopping pattern is again selected by the two transmitters is lower.

In a configuration, for an emission of the group of the partial telegrams, the transmitter generates a hopping pattern through a generation scheme. In this configuration, e.g., the transmitter changes a hopping pattern in order to obtain a new one therefrom for a further emission. Alternatively, the transmitter generates the hopping pattern based on predetermined parameters and/or variables. In the case, the generation scheme is advantageously also known on the receiver side. In a configuration, the generation of the hopping pattern is carried out in particular in dependence on a randomly selected parameter.

In a configuration, for an emission of the group of partial telegrams following a preceding emission, the transmitter generates a hopping pattern by means of an offset of the times and/or the frequencies of the hopping pattern used for the preceding emission. In this configuration, the change of an existing hopping pattern consists of varying at least a transmission time and/or a transmission frequency as is to be used for the emission of the individual partial telegrams. Thus, in a repetition, at least one partial telegram is transmitted differently with respect to frequency and/or time in contrast to the preceding emission. In a configuration, all partial telegrams are transmitted with different frequencies, or with changes with respect to the time. In an optional configuration, the change of the hopping pattern is carried out only in discrete steps that refer to sizes of the hopping pattern. Thus, if a partial telegram comprises a certain transmission duration, e.g., the temporal offset is carried out in a dimension relative to this transmission duration. Alternatively or additionally, if a partial telegram comprises a certain bandwidth, e.g., the frequency offset is carried out in a dimension relative to this bandwidth.

In a configuration, the previously mentioned offset is carried out randomly.

In a configuration, for an emission of the group of the partial telegrams, the transmitter generates, a hopping pattern by means of a—in particular random and/or advantageously discrete-offset of the times and/or the frequencies of a hopping pattern randomly selected from the set of reference hopping patterns. In this configuration, a hopping pattern is randomly selected and subsequently changed with respect to time or frequencies.

In a configuration, the transmitter generates the hopping pattern by means of a discrete offset of the times relative to a temporal length of a partial telegram and/or a discrete offset of the frequencies relative to a channel bandwidth used for the emission. In this case, the advantageously random offset is carried out for the current hopping pattern, or the randomly selected hopping pattern.

In a configuration, the transmitter performs at least two emissions of the group of the partial packets in an interleaved manner, which is done by the transmitter emitting, during a pause between two partial telegrams of the one emission of the two emissions, a partial telegram of the other emission of the two emissions. In this configuration, the emissions are not separated from each another, but the individual emissions are partially pushed into each another so that at least one partial telegram of a—second-emission occurs in the pause between the two partial telegrams of another—first-emission.

In this case, this configuration is additional or alternative to using different hopping patterns in the different emissions.

In a configuration, the transmitter randomly determines within which pause of the one emission the transmitter emits a first partial telegram of the group of the partial telegrams of the other emission. In this configuration, the transmitter determines the temporal offset between the two emissions. Here, the transmitter determines within which pause between the two partial telegrams of a preceding emission it inserts a first partial telegram of the subsequent emission. In this case, the selection of the pause also depends on the hopping pattern used, since an overlap of the interleaved emissions with themselves is to be avoided.

In a configuration, the transmitter uses the same hopping pattern in the at least two interleaved emissions.

In an alternative configuration, in one of the at least two interleaved emissions, the transmitter uses the hopping pattern of the other one of the at least two interleaved emissions, wherein the transmitter provides this hopping pattern with a—in particular random and/or advantageously discrete-offset of the times and/or frequencies.

In a configuration, the transmitter generates the hopping pattern by means of a discrete offset of the times relative to a temporal length of a partial telegram and/or a discrete offset of the frequencies relative to a channel bandwidth used for the emission.

In a configuration, the transmitter inserts, into the transmitted partial telegrams and/or into payload data of the partial telegrams and/or into data that may be derived from the payload data of the partial telegrams (e.g. an error correction value, a CRC or a hash value), data with respect to the hopping pattern used and/or with respect to a change of the hopping pattern used in contrast to a preceding or a following hopping pattern and/or with respect to a parameter determining the selection and/or design of the hopping pattern used. Thus, at least one partial telegram carries data, or information, about the hopping pattern used. For example, the parameter is random number on the basis of which the transmitter selects or changes the hopping pattern. In an alternative configuration, the parameter is implicitly present in the transmitted data so that it does not have to be additionally introduced. For example, a part of the user data or the CRC, or a hash value, is used to derive a hopping pattern, since these values change from telegram to telegram and are therefore a random value that is also different in different emissions. For example, an error correction value is the random parameter via which the transmitter generates and/or selects a current hopping pattern.

In a configuration which adds to one of the above configuration or is an alternative thereto, in the multiple (i.e., at least twice) emission of the group of the partial telegrams, the transmitter uses different transmission frequency bands, respectively. In this case, the multiple emissions may take place with different or the same hopping patterns. In a configuration, at least two emissions are pushed into each other, or are interleaved. In a configuration, the transmission frequency bands at least partially overlap. In an alternative configuration, the transmission frequency bands are free of overlaps.

Furthermore, the invention solves the object by means of a method for transmitting data.

In this case, the method includes at least the following steps:

Data is emitted in the form of a group of at least two partial telegrams that together comprise the data and that are shorter than an individual telegram comprising the data. In this case, the group of the partial telegrams is emitted according to a hopping pattern that refers to times and/or transmission frequencies of the emission of the individual partial telegrams. In this case, the group of the partial telegrams is emitted multiple times—i.e., at least twice.

The above configurations of the transmitter may be realized by steps of corresponding configurations of the method so that a repetition of the discussions is omitted here.

Furthermore, the invention solves the object by means of a receiver.

The receiver receives from a transmitter partial telegrams that together comprise data and that are shorter than an individual telegram comprising the data. In addition, the receiver identifies at least one hopping pattern used by the transmitter when emitting the partial telegrams, the hopping pattern referring to times and/or transmission frequencies of the emission of the individual partial telegrams.

In a configuration, for the identification of the hopping pattern, the receiver accesses a stored set of reference hopping patterns. Thus, the receiver tries the reference hopping patterns one after the other until the right one has been found.

In a configuration, the receiver takes a previously identified hopping pattern as the starting point for the identification of the—therefore current-hopping pattern. Therefore, the receiver performs a type of extrapolation in order to infer the hopping pattern of a current emission from an identified hopping pattern.

In a configuration, the receiver determines, starting from the received partial telegrams of an emission of a group of partial telegrams, at least one change of a hopping pattern of a preceding emission of the group of partial telegrams. Thus, the receiver determines changes with respect to a frequency offset and/or temporal offset of a hopping pattern used for an emission in contrast to a previously used hopping pattern by means of the evaluation of the partial telegrams.

In a configuration, the receiver divides the received partial telegrams and assigns them to different emissions of a group of partial telegrams. Thus, for example, if the transmitter generates the emissions such that partial telegrams of a following emission are inserted between the partial telegrams of a preceding emission, the receiver sorts the partial telegrams to the individual emissions and, in particular, does not process them all together. In other words: the transmitter interleaves at least two emissions of the group of the partial telegrams. The receiver receives the partial telegrams and assigns the partial telegrams to the individual emissions so that the receiver, e.g., separates whether a partial telegram belongs to the first emission or to a repetition.

In a configuration, the receiver combines received partial telegrams that belong to different interleaved emissions of a group of partial telegrams. Thus, the receiver combines partial telegrams that belong, e.g., to a first emission (the so-called initial emission) and a second emission (i.e. a first repetition). For example, this is carried out by means of MRC (Maximum Ratio Combining).

In a configuration, the receiver combines received partial telegrams that belong to different emissions of a group of partial telegrams. For example, this refers to emissions whose hopping patterns are shifted with respect to each other or differ from each other.

In a configuration, the receiver searches, within the received partial telegrams, for the occurrence of different emissions of a group of partial telegrams by means of a hypothesis test using a temporal offset and/or frequency offset.. Thus, for example, the receiver searches for a first emission and after a second emission. For this, it uses different values for a temporal offset and/or a frequency offset and checks which offset fits to the received partial telegram. Alternatively or additionally, a search is performed in the available reference sequences until the right one has been found.

In an additional or alternative configuration, the receiver searches, within the received partial telegrams, for the occurrence of different emissions of a group of partial telegrams by means of a hypothesis test using a set of reference sequences. For example, the set of reference sequences is stored in a data memory of the receiver.

In a configuration, the receiver accesses data in the partial telegrams for the identification of the hopping pattern and/or a time of an initial emission and/or a reference point for an emission of the partial telegrams. In a configuration, the data results from the payload data transmitted by the respective partial telegram. Thus, depending on the configuration, the currently used hopping pattern or a first emission of the group of the partial telegrams (i.e. the initial emission) or a reference point of the emission, or repetitions, is identified.

Furthermore, the invention solves the object by means of a method for receiving data.

In this case, the method includes at least the following steps:

Partial telegrams are received that together comprise the data and that are shorter than an individual telegram comprising the data. In addition, a hopping pattern used when emitting the partial telegrams is identified, the hopping pattern referring to times and transmission frequencies in the emission of the individual partial telegrams.

In a configuration, the partial telegrams belong to groups of partial telegrams. In this case, in a configuration, the group of partial telegrams is received several times (i.e., at least twice).

The above configurations of the receiver may be realized by steps of the corresponding configurations of the method so that a repetition of the discussion is omitted herein.

In addition, the invention refers to a system for signal transmission that comprises at least one transmitter according to one of the above discussed configurations and at least one receiver according to one of the above configurations.

Finally, the invention refers to a computer program having a program code for performing the above mentioned method according to any one of the configurations.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
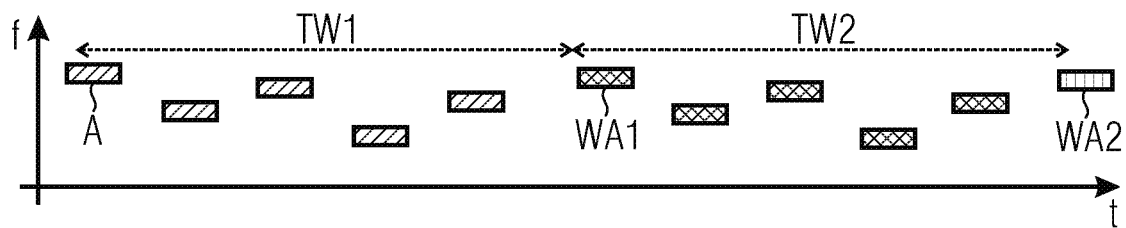
FIG. 1 shows a schematic illustration of the repeated emission of partial telegrams by a transmitter.

FIG. 1 illustrates that a group of—here for example—five partial telegrams is sent out by a transmitter with a hopping pattern. The group of the partial telegrams is denoted with A. The x-axis shows the time and the y-axis shows the frequency.

Here, group A is repeated twice, wherein only a first partial telegram of the second repetition is depicted. The first repetition of group A is denoted with WA1 and the second repetition is denoted with WA2. Thus, there are three emissions of group A. The temporal duration of a transmission is denoted with TW, wherein the durations TW1 for the first emission and TW2 for the second emission are here the same due to the respectively same hopping pattern.

Thus, FIG. 1 shows the case in which only one transmitter emits signals.

Figure 2:
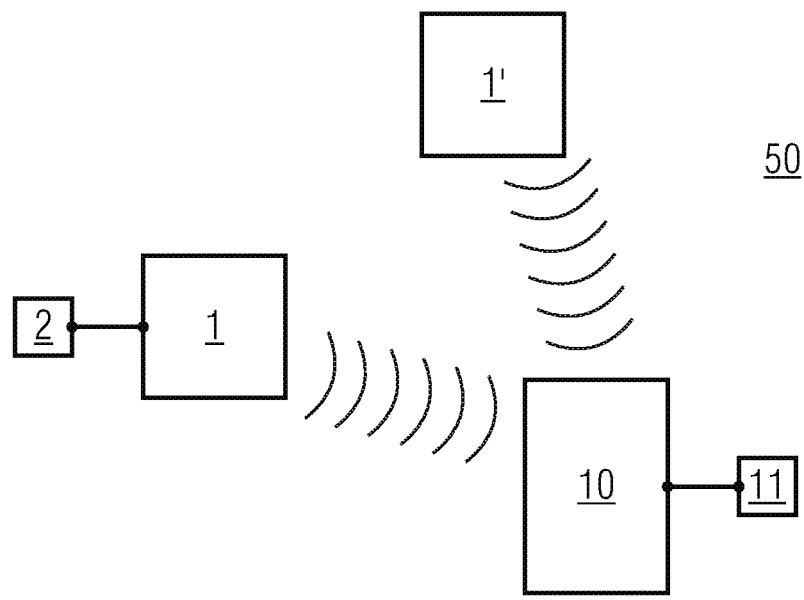
FIG. 2 shows a schematic illustration of a system for data transmission.

FIG. 2 shows a system 50 in which two transmitters 1, 1' are present in the illustrated constellation, each using telegram splitting and each emitting signals received and processed by a receiver 10.

Figure 3:
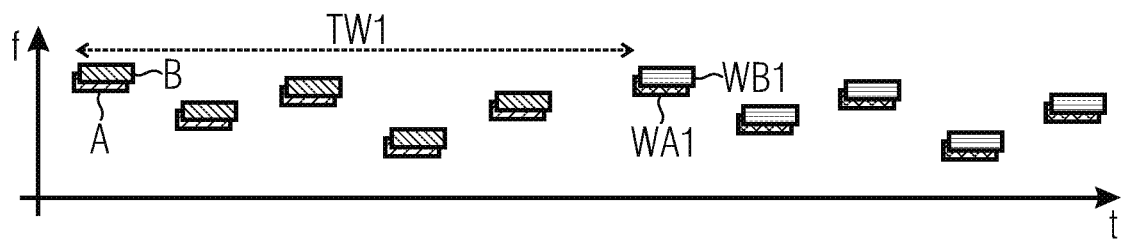
FIG. 3 shows a schematic illustration of the repeated emission of partial telegrams by two transmitters having the same hopping patterns, respectively.

FIG. 3 shows what happens if the two transmitters 1, 1' use the same hopping pattern.

In FIG. 3, the groups of the partial telegrams that the two transmitters 1, 1' of FIG. 2 transmit are denoted with A and B. Since both transmitters 1, 1' use the same hopping pattern, there is an overlap of the partial telegrams in each emission of the respective group A, B. The partial telegrams are drawn with a slight offset so that this can be seen in FIG. 3. The overlap of the groups A, B and also of the repeated groups WA1 and WB1 leads to the fact that a reliable reception of the partial telegrams is no longer possible.

Thus, one of the transmitters 1 of the configuration of FIG. 2 comprises a data memory 2 in which a set of reference hopping patterns is stored. This allows the transmitter 1 to use different hopping patterns for the individual emissions of the group of partial telegrams.

Thus, the transmitter 1 uses a randomly selected hopping pattern in the transmission of a repetition of the group of partial telegrams instead of the hopping pattern of the initial emission (which is here the first emission of the group of partial telegrams). In an alternative configuration, the hopping pattern for the repetition is generated and, in the case shown, is taken from the set of the known hopping patterns.

The receiver 10 knows the corresponding generation rule, or, in this case, the set of reference hopping patterns. For this, in the example shown, the receiver 10 accesses a separate data memory 11. For example, the receiver 10 identifies the hopping pattern used by means of a hypothesis test, by testing different hopping patterns.

Figure 4:
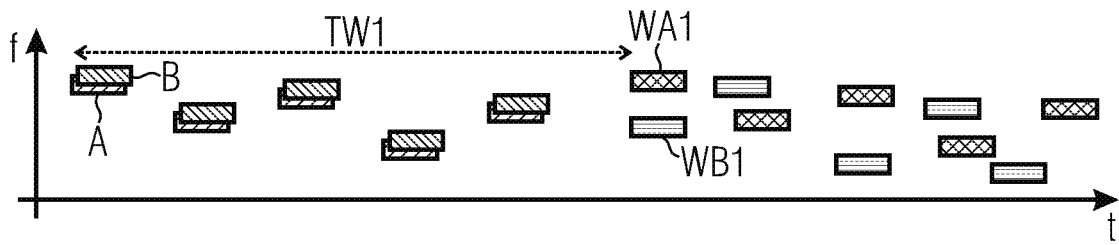
FIG. 4 shows a schematic illustration of the repeated emission of partial telegrams by two transmitters, wherein one transmitter switches the hopping pattern for a repetition.

FIG. 4 shows the case resulting from both groups of partial telegrams A and B being emitted in the respectively first emission with the same hopping pattern and, in the first repetition of Group B which is here denoted with WB1 and is therefore the second emission of Group B, a hopping pattern being used that differs from the first emission.

It can be seen that there are no more overlaps of the partial telegrams in the respective first repetition.

Due to the random selection of the hopping pattern, the repetition of the one transmitter will only correspond with a low probability to the hopping pattern that the other transmitter has selected for the emission of the repetition. The probability that both transmitters again use the same hopping pattern decreases with the number of selection possibilities, or variation possibilities, of a hopping pattern. For example, a set with a larger number of hopping pattern decreases the overlap probability of the repetitions.

Thus, a telegram (as a term for a group of partial telegrams) which would not have been decodable without a repetition due to the overlap with another transmission with an identical hopping pattern may also be received by means of a repetition.

Figure 5:
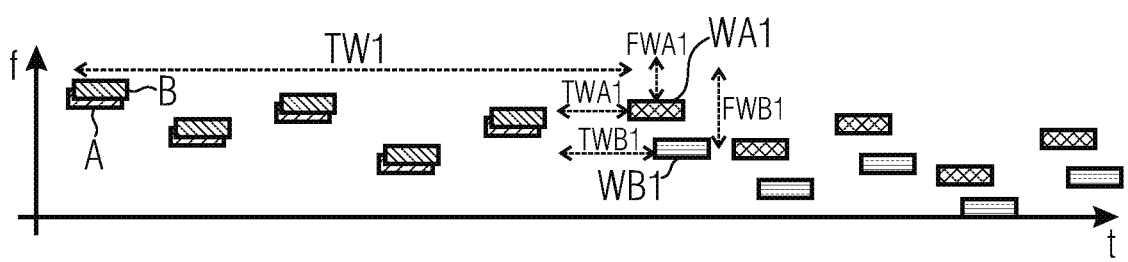
FIG. 5 shows a schematic illustration of the repeated emission of the partial telegrams by two transmitters, wherein one transmitter changes the hopping pattern for a repetition.

FIG. 5 illustrates that the hopping pattern of the first emission is changed in the first repetition. Here, in the second emission of group B (referred to as first repetition WB1), the position with respect to the frequency (FWB1) and with respect to the time (TWB1) is changed so that the hopping patterns of the respective first repetitions (WA1 and WB1) are shifted with respect to each other and do not overlap any longer. Thus, no other hopping pattern is used, but the hopping pattern used for the preceding transmission is offset in a advantageously random manner in time and/or frequency in order to reduce the probability of a collision.

The random offset is ideally selected such that discrete steps are created for a temporal offset and/or frequency offset which, when selected differently, enable a reception of an identical hopping pattern with a different offset. Thus, for example, the frequency offset is performed in steps of sub-transmission channels or the temporal offset is performed in parts of transmission durations.

Figure 6:
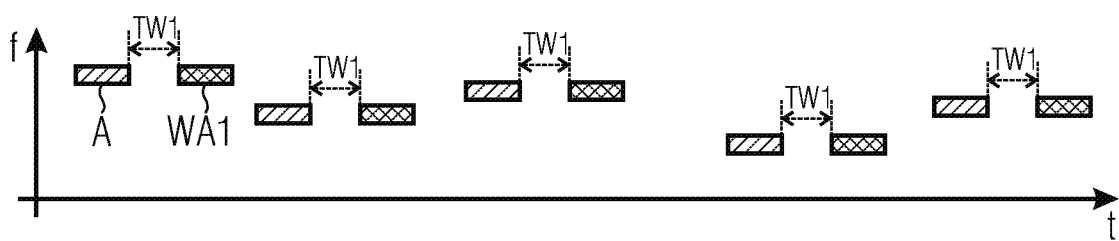
FIG. 6 shows a schematic illustration of the twofold emission of a group of partial telegrams, wherein the emissions are interleaved.

FIG. 6 shows a configuration in which two transmissions of a group of partial telegrams (A and WA1) are interleaved. This means that partial telegrams of an emission are sent out in the pauses between the partial telegrams of another emission.

If the repetitions (i.e. starting from the second emission) are transmitted after the original telegram, or after the first emission, it is advantageous, in case of a variable telegram length, to select the distance of the repetition such that the maximum possible length of the original telegram (i.e. of the group of the partial telegrams to be transmitted) fits between the emission of the first partial telegram of the original telegram (i.e. the first emission) and the first partial telegram of the first repetition (i.e. the second emission). If this is not ensured, the emission of the telegram and its own repetition may overlap.

On the other hand, a transmission duration that is too long is of disadvantage for the receiver since, due to quartz tolerances, the times of the partial telegrams in the repetitions no longer exactly correspond to the expected time. Due to this, MRC may only be performed if the temporal error and frequency error which results from the quartz may be exactly determined in the first emission and also in the following emissions with sufficient accuracy. Generally, this may not be done due to noise and interferences.

It is an advantage that the overall transmission duration and therefore the latency is reduced. Due to the interleaved transmission of the initial emission and the repetition(s), a combination of the reception data of the repetition with the initial emission is possible without a separate synchronization of the time and the frequency.

In a configuration, the time between the emissions of the partial telegrams is firmly given. Here, the temporal offset between the partial telegrams of the individual emissions is equal to a fixed value TW1.

Alternatively or additionally, a shift with respect to the frequencies takes place.

In this case, the interleaved emission may also be combined with the other preceding configurations.

In this case, it is to be noted that the pauses of the hopping patterns are tuned to each other so that the hopping patterns do not push into each another during the entire duration of the emission. This means that the accumulated sum of the pause durations of the hopping patterns that are interleaved may not exceed a threshold value since the emissions of the partial telegrams could collide.

For example, when operating a synchronous network, a participant expects a response to his/her message within a firmly specified time slot and a firmly specified frequency after its own emission. In this case, the exact time and the exact frequency of the first emission of the group of the partial telegrams have to be known if these are used as a reference time.

In a configuration, the random parameter from which the offset of a hopping pattern relative to a preceding or, e.g., the hopping pattern is derived, is explicitly transmitted in the partial telegrams. In an alternative configuration, this done through data derived from the telegram (e.g., CRC, Hash, part of the telegram, part of the payload data).

In a configuration, the transmission time of the original telegram is determined by calculating via the received repetitions and the random parameter. In particular, this is advantageous in the case in which the initial emission could not be decoded due to interferences.

Alternatively or additionally, the emissions, or here in particular the repetitions, are done in different frequency bands. Thus, several frequency resources are used and the frequency diversity is employed. In addition, a careful treatment of the band of the initial emission, i.e., the first emission, takes place.

Accordingly, the receiver has a larger bandwidth than in the other configurations.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC or a microprocessor, e.g. in the form of an ARM architecture.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

The invention claimed is:

1. A transmitter,
wherein the transmitter comprises a transmitter device configured to emits data in the form of a group of at least two partial packets that together comprise the data and that are shorter than an individual data packet comprising the data,
wherein the transmitter device is configured to emits the group of the partial packets according to a hopping pattern that refers to times and/or transmission frequencies of the emission of the individual partial packets,
wherein the transmitter device is configured to emits the group of the partial packets at least twice,
wherein, for an emission of the group of the partial packets following a preceding emission, the transmitter device randomly offsets all hops of the hopping pattern used for the preceding emission in time and/or frequency by the same time and/or frequency offset,
wherein the transmitter device is configured to perform at least two emissions of the group of the partial packets in an interleaved manner, which is done by the transmitter device emitting, during a pause between two partial packets of the one emission of the two emissions, a partial packet of the other emission of the two emissions.

2. The transmitter according to claim 1,
wherein the transmitter uses different hopping patterns for each of the at least two emissions of the group of the partial packets.

3. The transmitter according to claim 2,
wherein, for a selection of the hopping patterns, the transmitter accesses a stored set of reference hopping patterns.

4. The transmitter according to claim 3,
wherein, for an emission of the group of the partial packets, the transmitter randomly selects a hopping pattern from the set of reference hopping patterns.

5. The transmitter according to claim 2,
wherein, for an emission of the group of the partial packets, the transmitter generates a hopping pattern through a generation scheme depending on a randomly selected parameter.

6. The transmitter according to claim 2,
wherein, for an emission of the group of the partial packets following a preceding emission, the transmitter generates a hopping pattern by means of a random and/or discrete offset of the times and/or the frequencies of the hopping pattern used for the preceding emission.

7. The transmitter according to claim 2,
wherein, for an emission of the group of the partial packets, the transmitter generates a hopping pattern by means of a random and/or discrete offset of the times and/or the frequencies of a hopping pattern randomly selected from the set of reference hopping patterns.

8. The transmitter according to claim 6,
wherein the transmitter generates the hopping pattern by means of a discrete offset of the times relative to a temporal length of a partial packet and/or a discrete offset of the frequencies relative to a channel bandwidth used for the emission.

9. The transmitter according to claim 1,
wherein the transmitter randomly determines within which pause of the one emission the transmitter emits a first partial packet of the group of the partial packets of the other emission.

10. The transmitter according to claim 1,
wherein the transmitter uses the same hopping pattern in the at least two interleaved emissions.

11. The transmitter according to claim 1,
wherein, in one of the at least two interleaved emissions, the transmitter uses the hopping pattern of the other one of the at least two interleaved emissions with a random and/or discrete offset of the times and/or frequencies.

12. The transmitter according to claim 11,
wherein the transmitter generates the hopping pattern by means of a discrete offset of the times relative to a temporal length of a partial telegram and/or a discrete offset of the frequencies relative to a channel bandwidth used for the emission.

13. The transmitter according to claim 1,
wherein the transmitter inserts, into the transmitted partial packets and/or into payload data of the partial packets and/or into data that are derived from the payload data of the partial packets, data with respect to the hopping pattern used and/or with respect to a change of the hopping pattern used in contrast to a preceding or a following hopping pattern and/or with respect to a parameter determining the selection and/or design of the hopping pattern used.

14. The transmitter according to claim 1,
wherein, in the multiple emissions of the group of the partial packets, the transmitter uses different transmission frequency bands, respectively.

15. The transmitter according to claim 14,
wherein the transmission frequency bands overlap.

16. A method for emitting data, the method comprising:
emitting data in the form of a group of at least two partial packets that together comprise the data and that are shorter than an individual data packet comprising the data,
wherein the group of the partial packets is emitted according to a hopping pattern that refers to times and/or transmission frequencies of the emission of the individual partial packets, and
wherein the group of the partial packets is emitted at least twice,
wherein, for an emission of the group of the partial packets following a preceding emission, all hops of the hopping pattern used for the preceding emission are randomly offset in time and/or frequency by the same time and/or frequency offset, wherein at least two emissions of the group of the partial packets are performed in an interleaved manner, which is done by emitting, during a pause between two partial packets of the one emission of the two emissions, a partial packet of the other emission of the two emissions.

17. A receiver,
wherein the receiver comprises a receiver device configured to receives from a transmitter partial telegrams that together comprise data and that are shorter than an individual data packet comprising the data, and
wherein the receiver device is configured to identify at least one hopping pattern used by the transmitter when emitting the partial packets, the hopping pattern referring to times and/or transmission frequencies of the emission of the individual partial packets,
wherein the group of partial packets is emitted by the transmitter at least twice,
wherein, for an emission of the group of the partial packets following a preceding emission, all hops of the hopping pattern used for the preceding emission are randomly offset in time and/or frequency by the same time and/or frequency offset, wherein at least two emissions of the group of the partial packets are performed in an interleaved manner, such that during a pause between two partial packets of the one emission of the two emissions, a partial packet of the other emission of the two emissions is received.

18. The receiver according to claim 17,
wherein, for the identification of the hopping pattern, the receiver accesses a stored set of reference hopping patterns.

19. The receiver according to claim 17,
wherein the receiver takes a previously identified hopping pattern as the starting point for the identification of the hopping pattern.

20. The receiver according to claim 17,
wherein the receiver determines, starting from the received partial packets of an emission of a group of partial packets, at least one change of a hopping pattern of a preceding emission of the group of partial packets.

21. The receiver according to claim 17,
wherein the receiver divides the received partial packets and assigns them to different emissions of a group of partial packets.

22. The receiver according to claim 17,
wherein the receiver combines received partial packets that belong to different interleaved emissions of a group of partial packets.

23. The receiver according to claim 17,
wherein the receiver combines received partial packets that belong to different emissions of a group of partial packets.

24. The receiver according to claim 17,
wherein the receiver searches, within the received partial packets, for the occurrence of different emissions of a group of partial packets by means of a hypothesis test using a temporal offset and/or frequency offset.

25. The receiver according to claim 17,
wherein the receiver searches, within the received partial packets, for the occurrence of different emissions of a group of partial packets by means of a hypothesis test using a set of reference sequences.

26. The receiver according to claim 17,
wherein the receiver accesses data in the partial packets for the identification of the hopping pattern and/or a time of an initial emission and/or a reference point for an emission of the partial packets.

27. A method for receiving data, the method comprising:
receiving partial packets that together comprise the data and that are shorter than an individual data packet comprising the data, and
identifying a hopping pattern used when emitting the partial packets, the hopping pattern referring to times and transmission frequencies in the emission of the individual partial packets,
wherein the group of partial packets is emitted at least twice,
wherein, for an emission of the group of the partial packets following a preceding emission, all the hops of the hopping pattern used for the preceding emission are randomly offset in time and/or frequency by the same time and/or frequency offset, wherein at least two emissions of the group of the partial packets are performed in an interleaved manner, such that during a pause between two partial packets of the one emission of the two emissions, a partial packet of the other emission of the two emissions is received.

28. A system for signal transmission,
wherein the system comprises at least one transmitter according to claim 1 and at least one receiver according to claim 17.

29. A non-transitory digital storage medium having a computer program stored thereon which when executed by a computer causes the computer to perform the method for emitting data comprising:
- emitting data in the form of a group of at least two partial packets that together comprise the data and that are shorter than an individual data packet comprising the data,
- wherein the group of the partial packets is emitted according to a hopping pattern that refers to times and/or transmission frequencies of the emission of the individual partial packets, and
- wherein the group of the partial packets is emitted at least twice,
- wherein, for an emission of the group of the partial packets following a preceding emission, all hops of the hopping pattern used for the preceding emission are randomly offset in time and/or frequency by the same time and/or frequency offset, wherein at least two emissions of the group of the partial packets are performed in an interleaved manner, which is done by emitting, during a pause between two partial packets of the one emission of the two emissions, a partial packet of the other emission of the two emissions.

30. A non-transitory digital storage medium having a computer program stored thereon which when executed by a computer causes the computer to perform the method for receiving data comprising:
- receiving partial packets that together comprise the data and that are shorter than an individual data packet comprising the data, and
- identifying a hopping pattern used when emitting the partial packets, the hopping pattern referring to times and transmission frequencies in the emission of the individual partial packets,
- wherein the group of partial packets is emitted at least twice,
- wherein, for an emission of the group of the partial packets following a preceding emission, all hops of the hopping pattern used for the preceding emission are randomly offset in time and/or frequency by the same time and/or frequency offset, wherein at least two emissions of the group of the partial packets are performed in an interleaved manner, such that during a pause between two partial packets of the one emission of the two emissions, a partial packet of the other emission of the two emissions is received.

\* \* \* \* \*

UNITED STATES PATENT AND TRADEMARK OFFICE
CERTIFICATE OF CORRECTION

PATENT NO. : 11,368,186 B2
APPLICATION NO. : 16/598653
DATED : June 21, 2022
INVENTOR(S) : Gerd Kilian et al.

It is certified that error appears in the above-identified patent and that said Letters Patent is hereby corrected as shown below:

In the Claims

Claim 1, Column 11, Line 67:
Change "configured to emits data in the form of a group of at"
To --configured to emit data in the form of a group of at--

Claim 1, Column 12, Line 4:
Change "wherein the transmitter device is configured to emits the"
To --wherein the transmitter device is configured to emit the--

Claim 1, Column 12, Line 8:
Change "wherein the transmitter device is configured to emits the"
To --wherein the transmitter device is configured to emit the--

Signed and Sealed this
Twenty-third Day of May, 2023

Katherine Kelly Vidal
*Director of the United States Patent and Trademark Office*